United States Patent
Lee et al.

(10) Patent No.: US 7,437,743 B2
(45) Date of Patent: Oct. 14, 2008

(54) OPTICAL DISK DRIVE

(75) Inventors: Jeung Rak Lee, Suwon-Si (KR); Hong Kyun Yim, Suwon-Si (KR)

(73) Assignee: Samsung Electronics Co, Ltd., Siwon-si (KR)

( * ) Notice: Subject to any disclaimer, the term of this patent is extended or adjusted under 35 U.S.C. 154(b) by 490 days.

(21) Appl. No.: 11/194,570

(22) Filed: Aug. 2, 2005

(65) Prior Publication Data
US 2006/0168599 A1    Jul. 27, 2006

(30) Foreign Application Priority Data
Jan. 27, 2005    (KR)    .................... 10-2005-0007669

(51) Int. Cl.
*G11B 17/041*    (2006.01)
(52) U.S. Cl. .................. 720/606; 720/615; 720/616; 720/629; 720/643; 720/645; 720/658
(58) Field of Classification Search ................ 720/606, 720/615, 616, 643, 645, 658, 729
See application file for complete search history.

(56) References Cited

U.S. PATENT DOCUMENTS

| | | | | |
|---|---|---|---|---|
| 4,891,727 A | * | 1/1990 | Sato et al. ................ | 360/137 |
| 5,864,533 A | * | 1/1999 | Yamada et al. ............ | 720/693 |
| 6,728,076 B1 | * | 4/2004 | Ko et al. ................... | 360/291 |
| 2002/0097657 A1 | * | 7/2002 | Seo et al. .................. | 369/77.1 |
| 2004/0027962 A1 | * | 2/2004 | Kabasawa ................. | 369/75.2 |

FOREIGN PATENT DOCUMENTS

JP    05-205456    8/1993

\* cited by examiner

*Primary Examiner*—William J. Klimowicz
*Assistant Examiner*—Carlos E Garcia
(74) *Attorney, Agent, or Firm*—Roylance, Abrams, Berdo & Goodman, L.L.P.

(57) ABSTRACT

An optical disk drive which decreases unit costs and reduces the size of a product. The optical disk drive includes a frame, a base chassis rotatably installed on the frame, a spindle motor and a pick-up device installed on the base chassis, a tray moving into and out of the frame when a disk cartridge is mounted on the tray, a loading device for operating the tray and the base chassis, and a disk cartridge recognizing device for sensing whether or not recognition holes formed through a disk cartridge case are opened or closed to display data of the disk cartridge. The disk cartridge recognizing device includes switches fixed to a front part of the frame, and a switch operating portion for operating the switches according to whether or not the recognition holes are opened or closed.

13 Claims, 4 Drawing Sheets

OPTICAL DISK DRIVE

CROSS-REFERENCE TO RELATED APPLICATION

This application claims the benefit under 35 U.S.C. § 119(a) of Korean Patent Application No. 2005-7669, filed Jan. 27, 2005, in the Korean Intellectual Property Office, the entire disclosure of which is incorporated herein by reference.

BACKGROUND OF THE INVENTION

1. Field of the Invention

The present invention relates to an optical disk drive. More particularly, the present invention relates to a cartridge recognizing device for recognizing data of a disk cartridge used in an optical disk drive.

2. Description of the Related Art

A disk cartridge houses recording/reproducing media, such as an optical disk or an optical magnetic disk, so that the media can be used in a disk drive. Recently, there has been an increased use of disk cartridges for recording multimedia data, such as image and audio data. Various types of disk cartridges that have improved recording density have been proposed to meet the high capacity requirements of multimedia. For example, there are various types of DVD-RAMs with different recording densities, such as a single-sided disk type, in which data is recorded on one side of a disk, a double-sided disk type, in which data is recorded on both sides of a disk, a single-sided double recording layer type, in which double recording layers are formed on one side of a disk so that data is recorded on the respective recording layers, a double-sided double recording layer type, in which double recording layers are formed on both sides of a disk so that data is recorded on the respective recording layers, and a single-sided disk type, in which a track pitch is narrowed.

The method for recording/reproducing data with a disk drive device varies depending on which type of disk is used. Accordingly, a disk drive requires means for determining the type of disk cartridge that is installed in the disk drive.

For this reason, a conventional disk cartridge has recognition holes for indicating the type of disk contained therein as well as other data regarding the disk cartridge, and recognition plates for opening and closing the recognition holes. The optical disk drive includes a switch that has a probe for detecting whether or not the recognition holes are opened or closed. The switch is installed on a base chassis, where a spindle motor and a pick-up device are also installed.

The conventional optical disk drive just described has several problems, however. First, the base chassis of the conventional optical disk drive is large because it includes a space for installing the switch, thereby increasing unit costs.

Second, the rear end of the base chassis of the conventional optical disk drive is hinged to the frame of the optical disk drive so that the spindle motor and the pick-up device can be raised and lowered by rotating the base chassis. A loading device for raising and lowering the base chassis and transferring a tray, on which the disk cartridge is placed, is installed in the front part of the optical disk drive. Since a part of the base chassis extends to the location of the loading device, and the switch is installed on this extended part of the base chassis, the space required to install the loading device is enlarged, thereby making it difficult to install the loading device.

Third, since the base chassis extends to the front part of the optical disk drive (where the loading device is located), the optical disk drive must be thick to provide sufficient height to raise and lower the spindle motor and the pick-up device.

Accordingly, there is a need for an optical disk drive with an improved apparatus for detecting the type of disk cartridge installed in the disk drive.

SUMMARY OF THE INVENTION

An aspect of the present invention is to solve at least the above problems and/or disadvantages and to provide at least the advantages described below. Accordingly, an aspect of the present invention is to provide an optical disk drive with a base chassis that is reduced in size, thus reducing costs.

Another aspect of the invention is to provide an optical disk drive, in which the space occupied by a switch for recognizing a disk cartridge is reduced, thereby providing an increased degree of freedom in designing the area for installing the loading device.

Yet another aspect of the invention is to provide an optical disk drive which has a small size, thus requiring a small space for installation.

In accordance with these aspects, the present invention provides an optical disk drive comprising a frame, a base chassis rotatably installed on the frame, a spindle motor and a pick-up device installed on the base chassis, a tray for moving into and out of the frame when a disk cartridge is mounted on the tray, a loading device for operating the tray and the base chassis, and a disk cartridge recognizing device for sensing whether or not recognition holes formed through a disk cartridge case are opened or closed to display data of the disk cartridge. The disk cartridge recognizing device includes switches fixed to a front part of the frame, and a switch operating portion for operating the switches according to whether or not the recognition holes are opened or closed.

Preferably, the switch operating portion includes an elastic unit installed on the tray and elastically deformed for operating the switches, and interlocking units installed on the frame and operated by the elastic unit for operating the switches.

Further, preferably, the elastic unit includes fixing portions fixed to the tray, pushing protrusions protruding from an upper surface of the tray and pushed according to whether or not the recognition holes are opened or closed, contact protrusions contacting the interlocking units for operating the interlocking units, and spring portions for restoring the pushing protrusions and the contact protrusions.

Moreover, preferably, each of the interlocking units includes a cam portion slidably contacting the corresponding contact protrusion for inducing the operation of the corresponding interlocking unit, a guide hook slidably latched on the frame, and a spring guide, on which a spring for restoring the corresponding interlocking unit is installed.

Preferably, the switches are installed on a housing PCB (printed circuit board) attached to a loading motor provided on the loading device.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
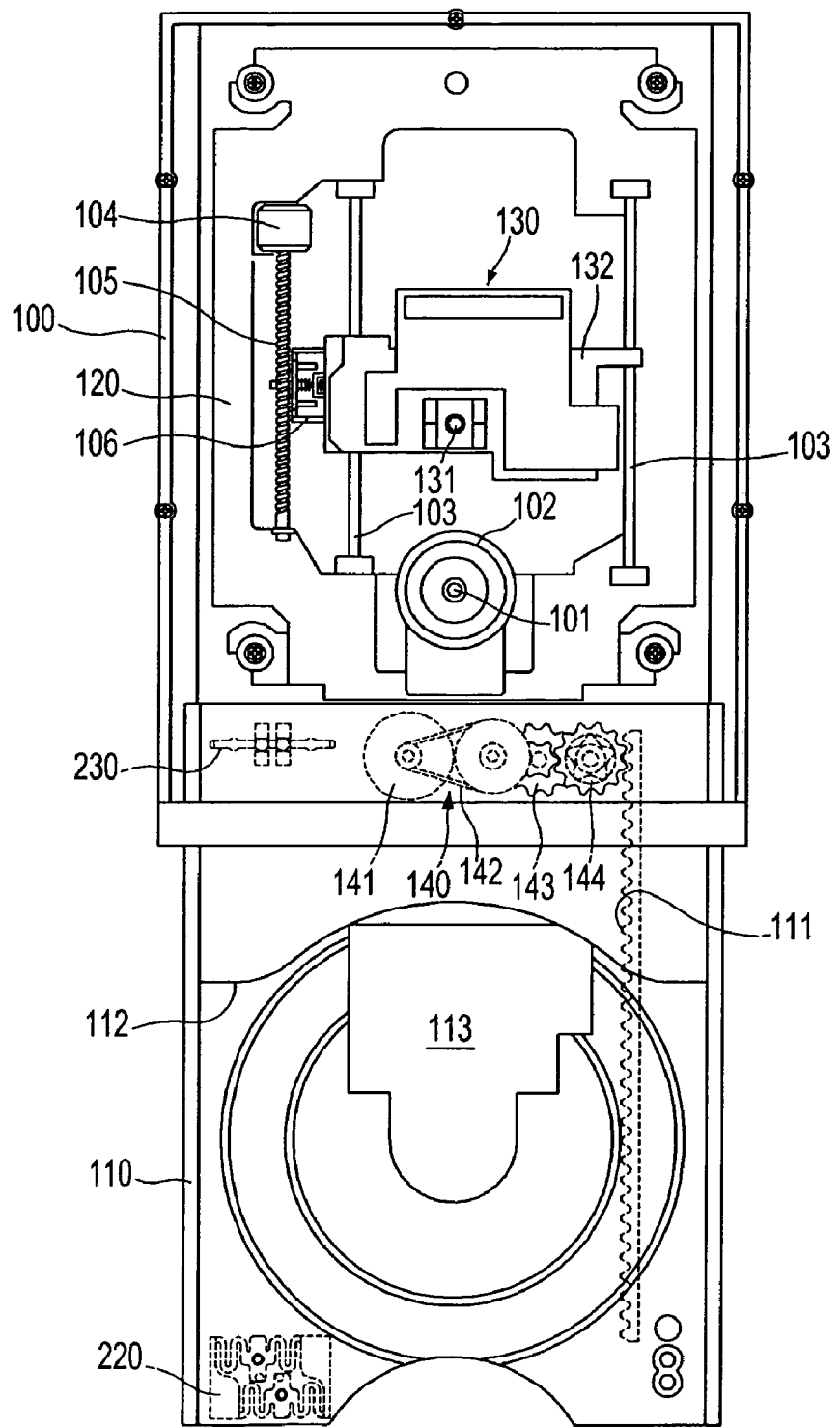
FIG. 1 is a plan view of an optical disk drive in accordance with an embodiment of the present invention.

With reference to FIG. 1, an optical disk player in accordance with an embodiment of the present invention comprises a frame 100 forming a structure thereof, and a tray 110 slidably installed on the frame 100.

A base chassis 120, preferably made by die-casting a metal plate into a designated shape, is installed on the frame 100. The rear part of the base chassis 120 is hinged to the frame 100 so that the base chassis 120 is rotatable. A spindle motor 101 for rotating an optical disk 20 contained in a disk cartridge 10 (FIG. 2) is installed at one side of the front part of the base chassis 120, and a turn table 102 for supporting the optical disk 20 is installed on a driving shaft of the spindle motor 101. The structure of the disk cartridge 10 will be described later. A pick-up device 130 for recording data on the optical disk 20 or reading data recorded on the optical disk 20 is installed at the central part of the base chassis 120. Although not shown in the drawings, the pick-up device 130 includes an optical system 131 having a laser diode for generating a laser to be irradiated on the optical disk 20, a plurality of lenses for irradiating the laser generated from the laser diode to the optical disk 20, and an optical detector for detecting data from light reflected by the optical disk 20. The pick-up device 130 further includes a pick-up base 132, on which the optical system 131 is installed. Two guide shafts 103, both ends of which are fixed to the base chassis 120, are respectively installed at both sides of the pick-up device 130. The two guide shafts 103 are installed at front and rear parts of the frame 100 in parallel, and support both sides of the pick-up base 132 such that the pick-up base 132 slides along the guide shafts 103. The pick-up device 130 is guided by the guide shafts 103, and reciprocates in the radial direction of the optical disk 20. A feeding motor 104 for transferring the pick-up device 130 is installed at one side of the base chassis 120. A driving shaft of the feeding motor 104 is connected to a lead screw 105 installed in parallel with the guide shafts 103. A slider 106 contacting a spiral groove formed in the lead screw 105 and reciprocating along the lead screw 105 for converting the rotating motion of the lead screw 105 into a reciprocating motion is connected to one side of the pick-up base 132.

A loading device 140 for loading/unloading the disk cartridge 10 is installed on the front part of the frame 100. The loading device 140 includes a loading motor 141, a belt 142 for transmitting the driving force of the loading motor 141, and a plurality of gears 143 and 144. A rack 111 connected to the gear 144 of the loading device 140 is installed on the lower surface of the tray 110. The rack 111 extends in the longitudinal direction of the tray 110, and engages the rotating gear 144 to transfer the tray 110 back and forth. Although not shown in the drawings, a sliding cam, which is driven by the loading device 140 and moves left and right for raising or lowering the front part of the base chassis 120, is installed between the loading device 140 and the base chassis 120. The structure of one suitable sliding cam is disclosed by Korean Laid-open Patent Publication No. 2005-008424, which is assigned to the assignee of the present invention. The entire disclosure of that publication is incorporated by reference herein, and a detailed description is omitted for clarity and conciseness.

The loading operation of the disk cartridge 10 will now be described. When the disk cartridge 10 is mounted on the tray 110 which is drawn out of the frame 100 and a loading signal is applied thereto, the loading motor 141 is driven so that the gears 143 and 144 are rotated, and the gear 144 that engages the rack 111 installed on the lower surface of the tray 110 pulls the tray 110 to the inside of the frame 100. Approximately simultaneously with the completion of the insertion of the tray 110 into the frame 100, the sliding cam moves to one direction, and raises the front part of the base chassis 120. When the front part of the base chassis 120 is raised, the turn table 102 engages an opening formed through the central portion of the optical disk 20 contained in the disk cartridge 10. Thus, the loading operation of the disk cartridge 10 is completed. The unloading operation of the disk cartridge 10 is performed in the reverse order of the loading operation.

A receipt groove 112 for receiving the disk cartridge 10 is formed in the upper surface of the tray 110. An opening 113, into which the turn table 102 is inserted, or through which the pick-up device 130 irradiates a laser on the optical disk 20, is formed through the central part of the tray 110.

Figure 2:
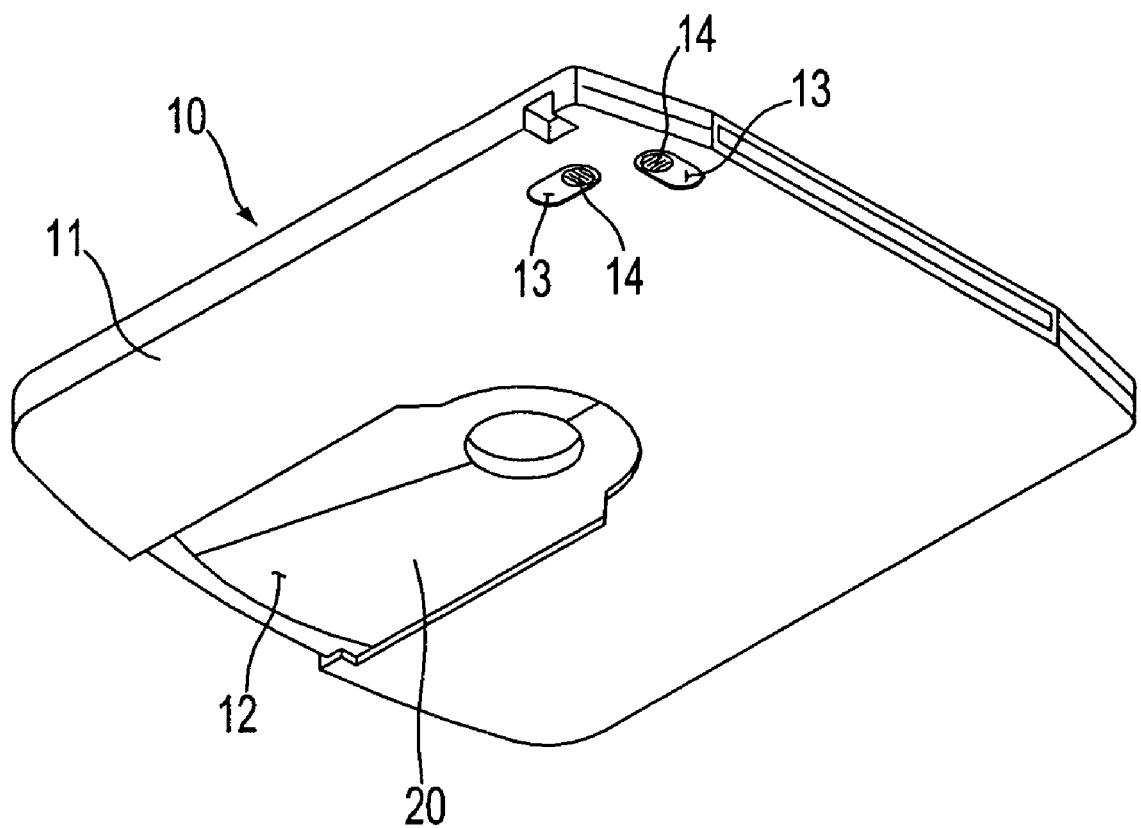
FIG. 2 is a perspective view of a disk cartridge used in the optical disk drive of FIG. 1.

With reference to FIG. 2, the disk cartridge 10 includes a case 11. The optical disk 20 is contained in the case 11. An opening 12, through which the turn table 102 is inserted into the central part of the optical disk 20, or through which the pick-up device 130 irradiates the laser on the optical disk 20, is formed through the lower surface of the case 11. Recognition holes 13 for displaying data of the disk cartridge 10 are formed through one side of the front part of the lower surface of the case 11, and recognition plates 14, which slide to open and close the recognition holes 13, are installed close to the recognition holes 13. The data of the disk cartridge 10 is data representing whether or not recording data on the disk is prevented, whether or not the disk has a single or dual recording layer, and whether or not the disk cartridge 10 has been opened. The recognition holes 13 represent this data, and the number of the recognition holes 13 is determined by the amount of data to be represented. Although this embodiment of the present invention describes a disk cartridge 10 with two recognition holes 13, the number of recognition holes 13 is not limited thereto.

Figure 3:
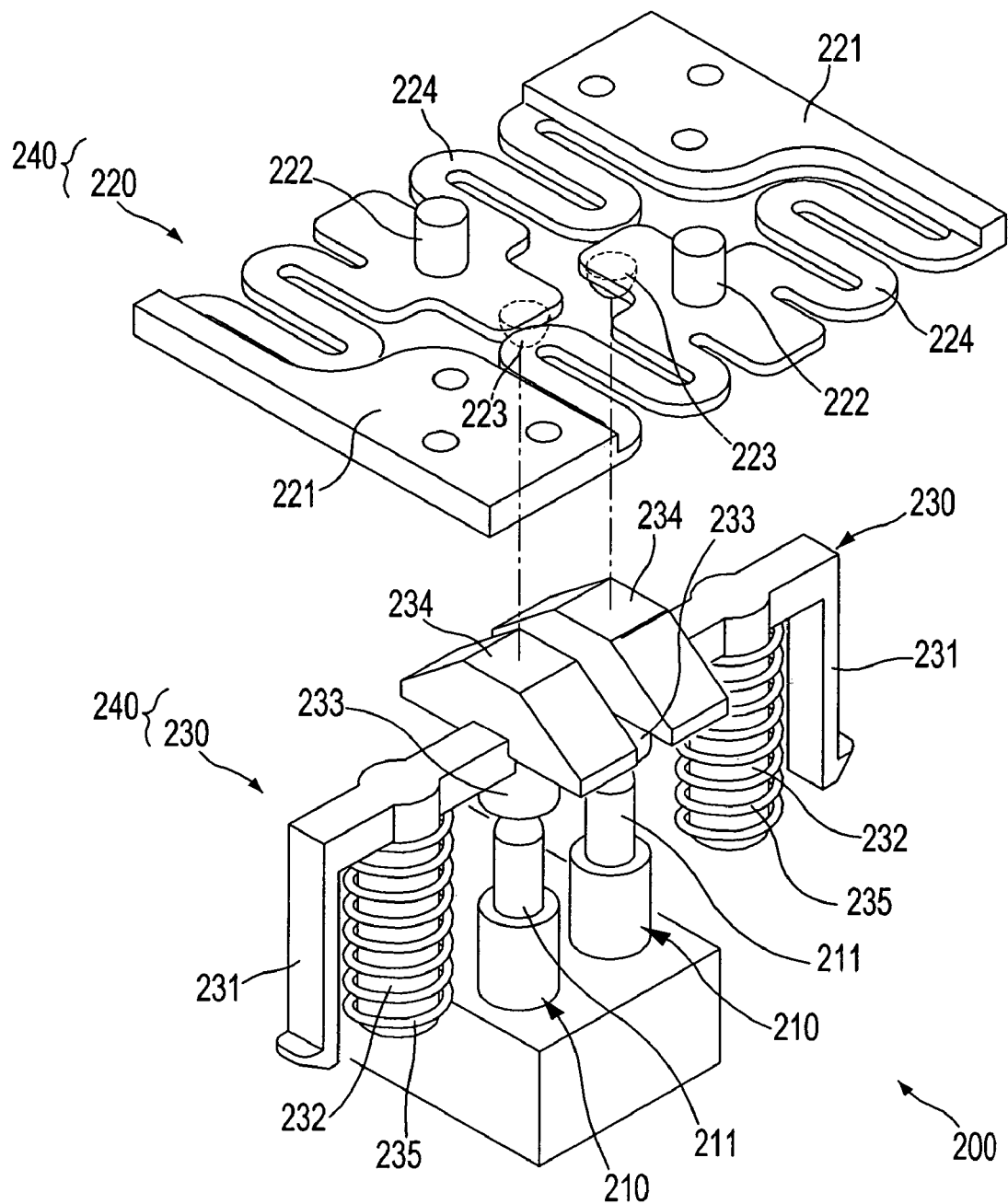
FIG. 3 is an exploded perspective view of a disk cartridge recognizing device of the optical disk drive of FIG. 1.
Figure 4:
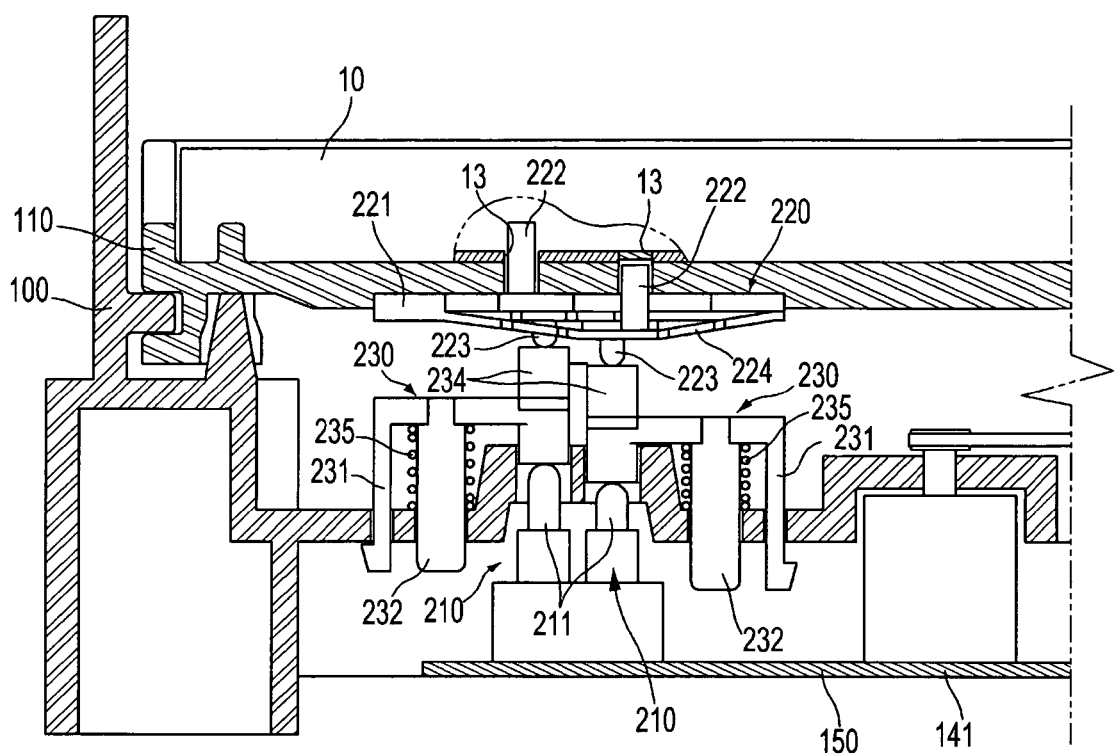
FIG. 4 is a sectional view illustrating the operation of the disk cartridge recognizing device of FIG. 3.

A disk cartridge recognizing device 200 for recognizing the data of the disk cartridge 10 by sensing whether or not the recognition holes 13 of the disk cartridge 10 are opened or closed will now be described. With reference to FIGS. 3 and 4, the disk cartridge recognizing device 200 includes switches 210, and a switch operating portion 240 for operating the switches 210 according to whether or not the recognition holes 13 are opened or closed. The switch operating portion 240 includes an elastic unit 220 elastically deformed according to the whether or not the recognition holes 13 are opened or closed, and interlocking units 230 ascending or descending according to the deformed state of the elastic unit 220 for operating the switches 210.

There are preferably the same number of switches 210 as recognition holes 13. A probe 211 that reciprocates into and out of the corresponding one of the switches 210 is installed on the upper part of each of the switches 210. Although not shown in the drawings, a spring, which applies restoring force for pushing the probe 211 outwardly, is contained in each of the switches 210. The switches 210 are installed on a housing printed circuit board (PCB) 150 (with reference to FIG. 4). The housing PCB 150 is attached to the lower part of the loading motor 141 of the loading device 140. By mounting the switches 210 on the housing PCB 150, it is possible to omit an expensive flexible printed circuit board (FPCB) or flexible flat cable (FFC) to connect the switches 210, thereby reducing material costs.

The elastic unit 220 is installed on the lower surface of the front part of the tray 110 (with reference to FIG. 1). The elastic unit 220 includes fixing portions 221 fixed to the lower surface of the tray 110 by connecting members or an adhesive agent, pushing protrusions 222 that protrude from the upper surface of the tray 110, contact protrusions 223 that protrude from the lower surface of the tray 110 so that the contact protrusions 223 contact the interlocking units 230, and spring portions 224 that elastically support the pushing protrusions 222 and the contact protrusions 223 such that the pushing protrusions 222 and the contact protrusions 223 can move up and down. The pushing protrusions 222 are installed so that locations of the pushing protrusions 222 correspond to the location of the recognition holes 13 of the disk cartridge 10 when the disk cartridge 10 is mounted on the tray 110. The pushing protrusions 222 are inserted into the recognition holes 13 when the recognition holes 13 are opened, and are pushed downwardly when the recognition holes 13 are closed. When the pushing protrusions 222 are pushed downwardly, the contact protrusions 223 also move downwardly. Preferably, the elastic unit 220 is made of soft plastic or metal so that the spring portions 224 of the elastic unit 220 have an appropriate restoring force. The elastic unit 220 moves back and forth together with the tray 110.

The interlocking units 230 are installed on the front part of the frame 100 (with reference to FIG. 1), and correspond to the switches 210. Each of the interlocking units 230 includes a guide hook 231 on one side that latches onto the frame 100, a spring guide 232, on which a spring 235 for restoring the interlocking unit 230 upwardly is installed, a pushing protrusion 233 for pushing the probe 211 of the corresponding switch 210, and a cam portion 234 slidably contacting the corresponding contact protrusion 223 of the elastic unit 220. A plurality of holes, into which the guide hooks 231 and the spring guides 232 are slidably inserted, are formed through the frame 100, and the interlocking units 230 are guided by the above holes, thus moving up and down. Both sides of the cam portion 234 are inclined towards the central portion of the cam portion 234. The above configuration of the cam portions 234 causes the contact protrusions 223 to move along the inclined surfaces of the cam portions 234 so that the interlocking units 230 are pushed downwardly when the elastic unit 220 together with the tray 110 is transferred to the inside of the frame 100. The springs 235 restore the positions of the interlocking units 230. Since separate springs are included in the switches 210, if the springs in the switches 210 have sufficient force to restore the interlocking units 230, the springs 235 may be omitted.

Hereinafter, with reference to FIG. 4, the operation of the disk cartridge recognizing device 200 will be described. When the disk cartridge 10 is mounted on the tray 110 that is drawn out of the frame 100, the pushing protrusions 222 of the elastic unit 220 are pushed according to whether or not the recognition holes 13 are opened or closed. For example, in FIG. 4, the left recognition hole 13 is opened and the right recognition hole 13 is closed. Accordingly, the right pushing protrusion 222 is pushed and the right contact protrusion 223 descends. When the loading device 140 is operated in the above state so that the tray 110 is inserted into the frame 100, the right contact protrusion 223 pushes the right interlocking unit 230 downwardly, and the pushing protrusion 233 of the right interlocking unit 230 presses the corresponding switch 210. Thereby, it is possible to sense that the right recognition hole 13 is closed. Then, the data of the disk cartridge 10 is recognized according to whether or not the switches 210 are turned on or off.

As is apparent to one skilled in the art from the above description, the present invention provides an optical disk drive with a disk cartridge recognizing device, in which switches for sensing whether or not recognition holes are opened or closed are installed on a housing PCB on the front part of a frame, thereby decreasing the size of a base chassis and reducing unit cost.

Furthermore, since the base chassis does not extend into the space where the loading device is located, there is a larger degree of freedom in designing the space for installing the loading device. It is also easier to design a thinner optical disk drive while still providing sufficient height for raising and lowering a spindle motor and a pick-up device.

While the invention has been shown and described with reference to certain embodiments thereof, it will be understood by those skilled in the art that various changes in form and details may be made therein without departing from the spirit and scope of the invention as defined by the appended claims.

What is claimed is:

1. An optical disk drive comprising:
   a frame;
   a base chassis rotatably installed on the frame;
   a spindle motor and a pick-up device installed on the base chassis;
   a tray for moving into and out of the frame when a disk cartridge is mounted on the tray;
   a loading device for operating the tray and the base chassis; and
   a disk cartridge recognizing device for sensing whether or not recognition holes formed through a disk cartridge case are opened or closed,
   wherein the disk cartridge recognizing device includes switches fixed to a front part of the frame, and a switch operating portion for operating the switches according to whether or not the recognition holes are opened or closed.

2. The optical disk drive as set forth in claim 1, wherein the switch operating portion includes an elastic unit installed on the tray which can be elastically deformed to operate the switches.

3. The optical disk drive as set forth in claim 2, wherein the switch operating portion further includes interlocking units installed on the frame and operated by the elastic unit to operate the switches.

4. The optical disk drive as set forth in claim 3, wherein the elastic unit includes:
   fixing portions fixed to the tray;
   pushing protrusions that protrude from an upper surface of the tray, the pushing protrusions being pushed according to whether or not the recognition holes are opened or closed;
   contact protrusions that contact the interlocking units to operate the interlocking units; and spring portions for restoring the pushing protrusions and the contact protrusions.

5. The optical disk drive as set forth in claim 4, wherein each of the interlocking units includes a cam portion slidably contacting the corresponding contact protrusion for inducing the operation of the corresponding interlocking unit.

6. The optical disk drive as set forth in claim 5, wherein each of the interlocking units further includes:
a guide hook slidably latched to the frame; and
a spring guide, on which a spring for restoring the corresponding interlocking unit is installed.

7. The optical disk drive as set forth in claim 1, wherein the switches are installed on a housing printed circuit board attached to a loading motor provided on the loading device.

8. A disk cartridge recognizing device for use in an optical disk drive that receives a disk cartridge with recognition holes on a tray that moves into and out of a frame of the optical disk drive, the disk cartridge recognizing device comprising:
an elastic unit installed on the tray, the elastic unit having pushing protrusions on one side, the pushing protrusions corresponding to the recognition holes in the disk cartridge so that they are pressed when the recognition holes are closed; and
interlocking units located on the frame, the interlocking units having switches operated by the elastic unit when the pushing protrusions are pressed.

9. A disk cartridge recognizing device according to claim 8, wherein
the elastic unit includes contact protrusions located on the opposite side of the pushing protrusions and corresponding to the pushing protrusions, the contact protrusions operating the interlocking units.

10. A disk cartridge recognizing device according to claim 9, wherein
the elastic unit includes fixing portions for attaching the elastic unit to the tray.

11. A disk cartridge recognizing device according to claim 9, wherein each interlocking unit includes:
a cam portion for interacting with a contact protrusion of the elastic unit.

12. A disk cartridge recognizing device according to claim 11, wherein each interlocking unit further includes:
a guide hook slidably latched to the frame; and
a spring guide, on which a spring for restoring the corresponding interlocking unit is installed.

13. A disk cartridge recognizing device for use in an optical disk drive that receives a disk cartridge with at least one recognition hole on a tray that moves into and out of a frame of the optical disk drive, the disk cartridge recognizing device comprising:
an elastic unit installed on the tray, the elastic unit having at least one pushing protrusion on one side of the elastic unit, the pushing protrusion corresponding to the at least one recognition hole in the disk cartridge so that the pushing protrusion is pressed when the at least one recognition hole is closed; and
an interlocking unit located on the frame, the interlocking unit having a switch that is operated by the elastic unit when the pushing protrusion is pressed.

* * * * *